United States Patent
Uenishi

(10) Patent No.: US 11,092,057 B2
(45) Date of Patent: Aug. 17, 2021

(54) EXHAUST GAS CONTROL APPARATUS FOR INTERNAL COMBUSTION ENGINE

(71) Applicant: TOYOTA JIDOSHA KABUSHIKI KAISHA, Aichi-ken (JP)

(72) Inventor: Toru Uenishi, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 16/904,574

(22) Filed: Jun. 18, 2020

(65) Prior Publication Data

US 2020/0400059 A1 Dec. 24, 2020

(30) Foreign Application Priority Data

Jun. 24, 2019 (JP) .............................. JP2019-116664

(51) Int. Cl.
*F01N 9/00* (2006.01)
*F02D 41/02* (2006.01)
*F02D 41/14* (2006.01)

(52) U.S. Cl.
CPC ........... *F01N 9/002* (2013.01); *F02D 41/029* (2013.01); *F01N 2560/06* (2013.01); *F01N 2900/08* (2013.01); *F01N 2900/1404* (2013.01); *F02D 41/1446* (2013.01)

(58) Field of Classification Search
CPC .. F01N 9/002; F01N 2900/08; F01N 2560/06; F01N 2900/1404; F01N /; F02D 41/029; F02D 41/1446
See application file for complete search history.

(56) References Cited

U.S. PATENT DOCUMENTS

| | | | | |
|---|---|---|---|---|
| 2010/0187089 | A1* | 7/2010 | Daido | B01D 46/442 204/155 |
| 2010/0212299 | A1* | 8/2010 | George | F01N 9/002 60/287 |
| 2016/0363022 | A1* | 12/2016 | Hoki | F01N 3/202 |
| 2018/0098390 | A1* | 4/2018 | Yagishita | H05B 6/6447 |
| 2018/0347422 | A1* | 12/2018 | Motoyoshi | F01N 3/028 |

FOREIGN PATENT DOCUMENTS

JP 2016200063 A 12/2016

* cited by examiner

*Primary Examiner* — Matthew T Largi
(74) *Attorney, Agent, or Firm* — Hauptman Ham, LLP

(57) ABSTRACT

An exhaust gas control apparatus for an internal combustion engine includes an electromagnetic wave output unit, an acquisition unit that acquires collection amounts of PM and substances other than PM based on a rotational speed and a fuel injection amount of the internal combustion engine, and a control unit that controls an output intensity of the electromagnetic wave output unit. The control unit causes electromagnetic waves to be output with a first output intensity when the collection amount of the substances other than PM becomes equal to or smaller than a predetermined threshold, and causes electromagnetic waves to be output with a second output intensity that is lower than the first output intensity when the collection amount of the substances other than PM becomes larger than the predetermined threshold, when the collection amount of PM has exceeded a permissible value of the collection amount of PM in the filter.

3 Claims, 6 Drawing Sheets

EXHAUST GAS CONTROL APPARATUS FOR INTERNAL COMBUSTION ENGINE

CROSS-REFERENCE TO RELATED APPLICATION

This application claims priority to Japanese Patent Application No. 2019-116664 filed on Jun. 24, 2019, incorporated herein by reference in its entirety.

BACKGROUND

1. Technical Field

The disclosure relates to an exhaust gas control apparatus for an internal combustion engine.

2. Description of Related Art

A filter is used for an exhaust passage to collect particulate matter (hereinafter referred to as PM) contained in exhaust gas of an internal combustion engine. For example, a gasoline particulate filter (GPF) is used in the case of a gasoline engine, and a diesel particulate filter (DPF) is used in the case of a diesel engine.

Conventionally, for example, control for burning the collected PM by raising the temperature of exhaust gas through an increase in the amount of fuel injection to reduce the amount of PM is performed. However, when the PM is burned with the collection amount of PM exceeding a permissible value of the collection amount in the filter, the filter may be damaged through a large amount of reaction heat, and the PM flowing in thereafter may pass through the filter. Thus, in Japanese Patent Application Publication No. 2016-200063 (JP 2016-200063 A), there is disclosed a method of heating and removing PM through combustion by appropriately irradiating a filter with microwaves and causing the PM collected by the filter to absorb the microwaves.

SUMMARY

On the other hand, substances collected by the filter include not only PM (mainly soot) but also substances other than PM (mainly substances having moisture and soluble organic constituents). Therefore, when microwaves are radiated with a large amount of the substances other than PM mixed together, the substances other than PM absorb a large amount of microwaves, and the radiation amount of microwaves that is needed to reduce the amount of PM to a predetermined amount increases. That is, the total radiation amount of microwaves radiated to reduce the amount of PM to the predetermined amount increases with respect to the combustion amount of PM, so the efficiency of burning PM may deteriorate.

The disclosure has been made in view of this problem. It is an object of the disclosure to provide an exhaust gas control apparatus that efficiently burns PM even when a large amount of substances other than PM are mixed together in a filter.

An exhaust gas control apparatus for an internal combustion engine according to the present disclosure is equipped with an electromagnetic wave output unit that outputs, to a filter that collects PM contained in exhaust gas discharged from the internal combustion engine, electromagnetic waves of a frequency that enables combustion of the PM collected by the filter, an acquisition unit that acquires collection amounts of PM as exhaust emissions contained in exhaust gas discharged from the internal combustion engine and substances other than PM, based on a rotational speed and a fuel injection amount of the internal combustion engine, and a control unit that controls an output intensity of the electromagnetic waves output by the electromagnetic wave output unit. In the exhaust gas control apparatus for the internal combustion engine, the control unit causes the electromagnetic wave output unit to output electromagnetic waves with a first output intensity when the collection amount of the substances other than PM becomes equal to or smaller than a predetermined threshold, and causes the electromagnetic wave output unit to output electromagnetic waves with a second output intensity that is lower than the first output intensity when the collection amount of the substances other than PM becomes larger than the predetermined threshold, in a case where the collection amount of PM has exceeded a permissible value of the collection amount of PM in the filter. Incidentally, the outputting of electromagnetic waves with the second output intensity that is lower than the first output intensity includes refraining from outputting electromagnetic waves.

Besides, in the exhaust gas control apparatus for the internal combustion engine according to the present disclosure, the control unit may cause the electromagnetic wave output unit to refrain from outputting electromagnetic waves when the collection amount of the substances other than PM becomes larger than the predetermined threshold, in the case where the collection amount of PM has exceeded the permissible value of the collection amount of PM.

Besides, in the exhaust gas control apparatus for the internal combustion engine according to the present disclosure, the control unit may cause an internal combustion engine control unit to perform exhaust gas temperature raising control when the collection amount of the substances other than PM becomes larger than the predetermined threshold, in the case where the collection amount of PM has exceeded the permissible value of the collection amount of PM.

The exhaust gas control apparatus for the internal combustion engine configured as described above makes it possible to reduce the radiation amount of electromagnetic waves absorbed by the substances other than PM collected by the filter, when the collection amount of the substances other than PM is larger than the predetermined threshold. Therefore, the ratio of the radiation amount of electromagnetic waves used for the combustion of PM to the total radiation amount of electromagnetic waves radiated before the end of radiation control increases. Accordingly, even when a large amount of the substances other than PM are mixed together in the filter, the PM can be efficiently burned.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

The embodiments of the disclosure will be described hereinafter with reference to the drawings.

Figure 1:
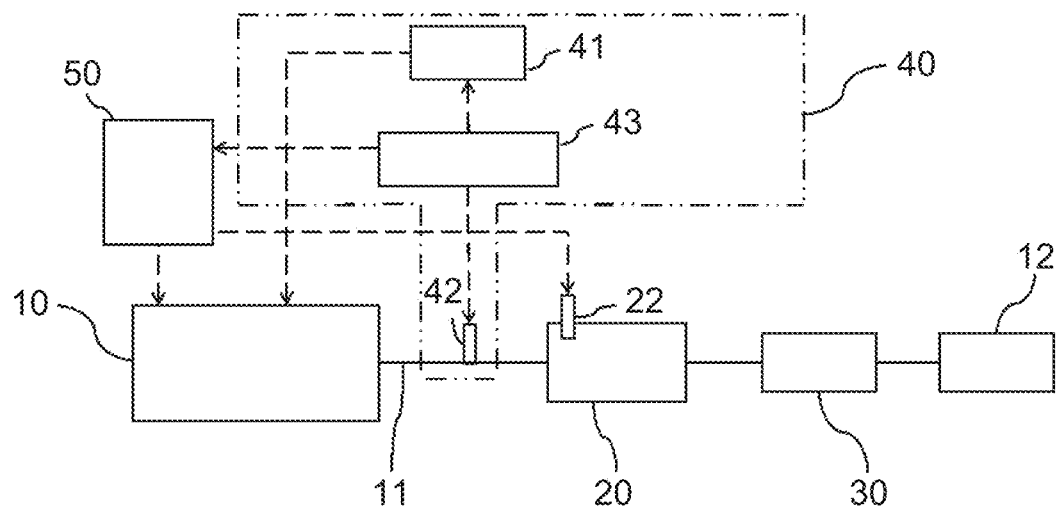
FIG. 1 is a schematic view showing the basic configuration of an exhaust gas control apparatus for an internal combustion engine according to one of the embodiments of the disclosure.

FIG. 1 is a schematic view showing the basic configuration of an exhaust gas control apparatus for an internal combustion engine according to one of the embodiments of the disclosure. The present system can also be favorably used in a gasoline engine or a diesel engine as an internal combustion engine.

The internal combustion engine 10 is equipped with an exhaust passage 11. A muffler 12 is installed on a downstream side of the exhaust passage 11.

A particulate filter (hereinafter referred to simply as the filter) 20 capable of collecting and removing PM contained in exhaust gas is installed upstream of the muffler 12 in the exhaust passage 11. This filter 20 is equipped with a temperature sensor 22 that can detect a temperature in the filter 20. A GPF can be used as the filter in the present system in the case where a gasoline engine is provided as the internal combustion engine. A DPF can be used as the filter in the present system in the case where a diesel engine is provided as the internal combustion engine.

Figure 2A:
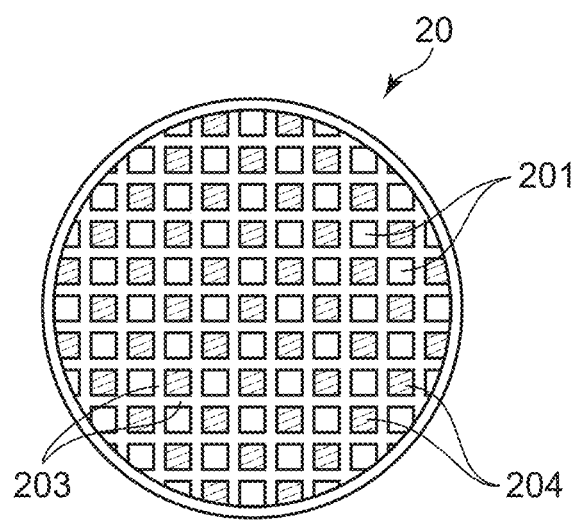
FIG. 2A is a front view of a filter according to the embodiment of the disclosure.
Figure 2B:
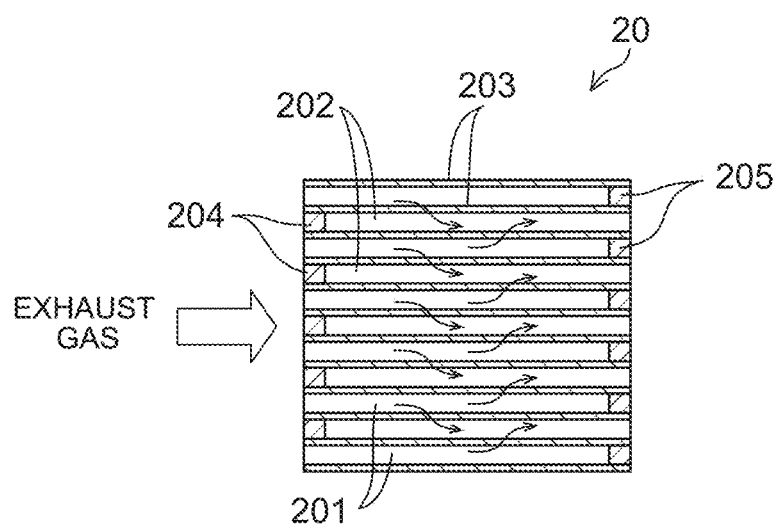
FIG. 2B is a lateral cross-sectional view of the filter according to the embodiment of the disclosure.

FIGS. 2A and 2B are views illustrating the structure of the filter 20 according to the embodiment of the disclosure. FIG. 2A is a front view of the filter 20, and FIG. 2B is a lateral cross-sectional view of the filter 20.

As shown in FIGS. 2A and 2B, the filter 20 has a honeycomb structure, and is equipped with a plurality of exhaust gas flow passages 201 and 202 that extend parallel to one another, and partitions 203 that separate the exhaust gas flow passages 201 and 202 from one another.

The exhaust gas flow passages 201 and 202 are constituted of exhaust gas inflow passages 201 each of which is open at an upstream end thereof and is closed at a downstream end thereof by a downstream plug 205, and exhaust gas outflow passages 202 each of which is closed at an upstream end thereof by an upstream plug 204 and is open at a downstream end thereof. Incidentally, in FIG. 2A, hatched regions represent the upstream plugs 204. Accordingly, the exhaust gas inflow passages 201 and the exhaust gas outflow passages 202 are alternately arranged via the thin partitions 203. In other words, the exhaust gas inflow passages 201 and the exhaust gas outflow passages 202 are arranged such that each of the exhaust gas inflow passages 201 is surrounded by four of the exhaust gas outflow passages 202, and that each of the exhaust gas outflow passages 202 is surrounded by four of the exhaust gas inflow passages 201.

The partitions 203 are formed of a porous material, for example, a ceramic such as cordierite, silicon carbide, silicon nitride, zirconia, titania, alumina, silica, mullite, lithium aluminum silicate, or zirconium phosphate. Accordingly, as indicated by arrows in FIG. 2B, exhaust gas first flows into the exhaust gas inflow passages 201, and then flows out into the exhaust gas outflow passages 202 adjacent thereto through pores inside the surrounding partitions 203. In this manner, the partitions 203 constitute inner peripheral surfaces of the exhaust gas inflow passages 201.

Returning to FIG. 1, an exhaust gas control catalyst 30 is installed between the muffler 12 and the filter 20 in the exhaust passage 11. For example, an oxidation catalyst, a three-way catalyst, an NOx catalyst, or the like can be adopted as the exhaust gas control catalyst 30. Incidentally, the exhaust gas control catalyst 30 may be configured integrally with the filter 20, and may be installed upstream of the filter 20 in the exhaust passage 11.

An exhaust gas control device 40 has an acquisition unit 41, an electromagnetic wave output unit 42, and a control unit 43. The acquisition unit 41 is connected to the internal combustion engine 10 and the control unit 43 via electrical wiring. The acquisition unit 41 stores a map that has been obtained in advance through an experiment or the like to identify collection amounts of PM and substances other than PM based on a rotational speed Ne and a fuel injection amount Q of the internal combustion engine. The acquisition unit 41 acquires the rotational speed and the fuel injection amount of the internal combustion engine 10 from the internal combustion engine 10, and acquires the collection amounts of PM and the substances other than PM. Incidentally, although the map is used in the present embodiment, there is no need to use the map as long as the collection amounts of PM and the substances other than PM can be acquired.

Figure 3:
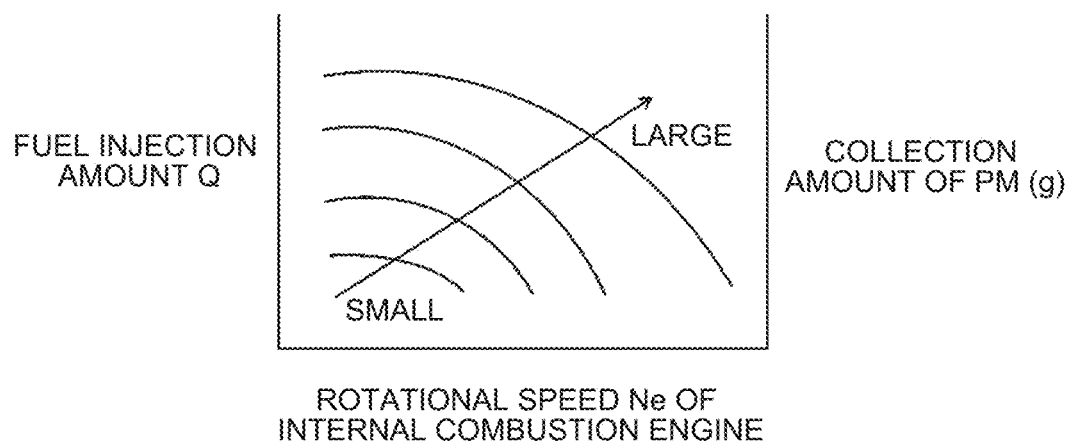
FIG. 3 is a view representing a collection amount of PM that is discharged from the internal combustion engine in the exhaust gas control apparatus for the internal combustion engine according to the embodiment of the disclosure.

FIG. 3 is a map representing the collection amount of PM corresponding to the rotational speed Ne and the fuel injection amount Q of the internal combustion engine. The collection amount of PM increases as the rotational speed of the internal combustion engine rises, or as the fuel injection amount increases. The acquisition unit 41 has this map stored therein.

The electromagnetic wave output unit 42 is connected to the control unit 43 via an electric line, and is installed upstream of the filter 20 in the exhaust passage 11. The electromagnetic wave output unit 42 removes PM through combustion by irradiating the PM collected by the filter 20 and the substances other than the PM collected by the filter 20 with microwaves. Besides, the output intensity of the microwaves output from the electromagnetic wave output unit 42 is output as such a value that the filter 20 is not damaged through excessive combustion of PM and the substances other than PM. Incidentally, the electromagnetic wave output unit 42 may not necessarily be required to output microwaves, but may output electromagnetic waves of other wavelengths as long as the PM can be removed through combustion by being irradiated.

The control unit 43 is connected to the acquisition unit 41, the electromagnetic wave output unit 42, and an internal combustion engine control unit 50 via electrical wiring. In the control unit 43, a first threshold ($\alpha 1$) is determined in advance as a permissible value of the collection amount of PM failing to pass through the filter 20, and a second threshold ($\beta 1$) is determined in advance as a value of the collection amount of the substances other than PM at which the substances other than PM can absorb more electromagnetic waves than PM when the PM collected by the filter 20 and the substances other than the PM collected by the filter 20 are irradiated with microwaves. Furthermore, a third threshold ($\alpha 2$) is determined in advance as a value of the collection amount of PM for ending output control of microwaves. In addition, a fourth threshold ($\beta 2$) is determined in advance as a value of the collection amount of the substances other than PM for ending the control for raising the temperature of exhaust gas. The control unit 43 compares the collection amounts of PM and the substances other than PM acquired by the acquisition unit 41 with these thresholds, and estimates whether or not the collection amounts have exceeded each of the thresholds.

Besides, the control unit 43 controls the start and end of irradiation by the electromagnetic wave output unit 42 with microwaves or the change in the output intensity of microwaves, based on a result of estimation on a relationship between the collection amounts of PM and the substances other than PM acquired by the acquisition unit 41 and $\alpha 1$, $\alpha 2$, and $\beta 1$. Incidentally, it will be described later how to output the output based on the result of estimation. Furthermore, the control unit 43 controls the internal combustion engine control unit 50 in such a manner as to start and end the control for raising the temperature of exhaust gas based on a result of estimation on a relationship between the collection amount of the substances other than PM and $\beta 1$ and $\beta 2$. Incidentally, it will be described later how to cause the internal combustion engine control unit 50 to perform the control for raising the temperature of exhaust gas based on the result of estimation.

The internal combustion engine control unit 50 is connected to the internal combustion engine 10, the temperature sensor 22, and the control unit 43 via electric lines. The internal combustion engine control unit 50 performs the control for raising the temperature of exhaust gas based on the results of estimation in the control unit 43.

Besides, a concrete example of the control for raising the temperature of exhaust gas by the internal combustion engine control unit 50 will be described. First of all, the internal combustion engine control unit 50 acquires a temperature detected by the temperature sensor 22. Then, the internal combustion engine control unit 50 increases the fuel injection amount of the internal combustion engine 10 such that the temperature of exhaust gas rises to a temperature at which the substances other than PM can burn, with reference to a map of the temperature of exhaust gas that is based on the fuel injection amount and that has been obtained in advance through an experiment or the like. Thus, the substances other than PM burn due to a rise in the temperature of exhaust gas, and the collection amount of the substances other than PM decreases. Incidentally, the above-mentioned configuration is not indispensable. A temperature in the filter 20 may be estimated through the use of a map obtained in advance through an experiment or the like from a rotational speed, a load, and the like of the internal combustion engine 10, without using the temperature sensor 22. Besides, instead of the foregoing, the control for raising the temperature of exhaust gas may be performed by increasing the amount of intake air in the internal combustion engine 10 or retarding the ignition timing, and is not limited to the above-mentioned method as long as the temperature in the filter 20 can be raised.

Figure 4:
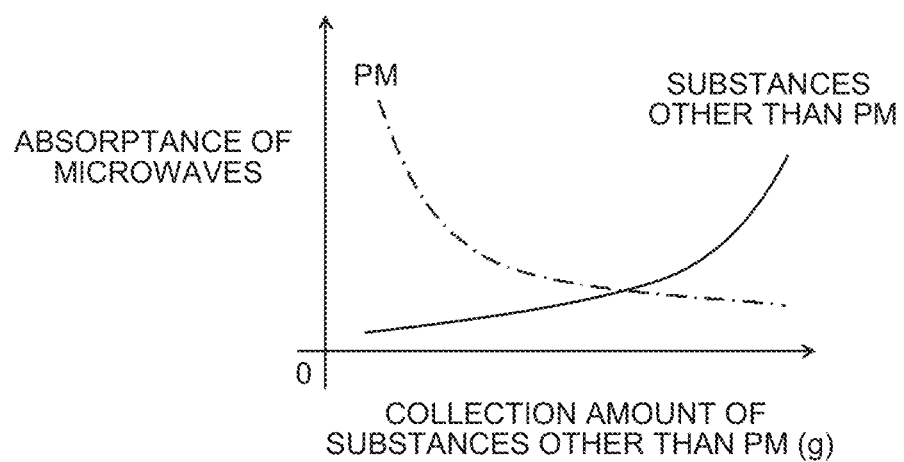
FIG. 4 is a view representing absorptances of microwaves by PM and substances other than PM in the case where a collection amount of the substances other than PM has changed in the exhaust gas control apparatus for the internal combustion engine according to the embodiment of the disclosure.

FIG. 4 is a view representing absorptances of microwaves by PM and the substances other than PM in the case where the collection amount of the substances other than PM has changed, in the exhaust gas control apparatus for the internal combustion engine according to the embodiment of the disclosure. The absorptance of microwaves by the substances other than PM is indicated by a solid line, and the absorptance of microwaves by PM is indicated by an alternate long and short dash line. As the collection amount of the substances other than PM increases, the absorptance of microwaves by the substances other than PM also increases. On the other hand, when the collection amount of the substances other than PM increases, the amount of microwaves absorbed by the substances other than PM increases. Therefore, the amount of microwaves absorbed by PM decreases, and the absorptance of microwaves by PM decreases. That is, conversely, by reducing the collection amount of the substances other than PM, the absorptance of microwaves by the substances other than PM falls, whereas the absorptance of microwaves by PM can be raised.

Figure 5:
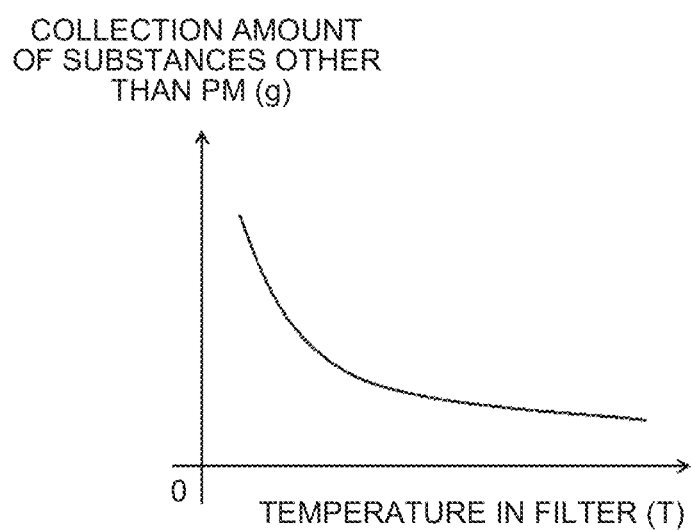
FIG. 5 is a view representing changes in the collection amount of the substances other than PM collected by the filter, with respect to a temperature in a GPF in the embodiment of the disclosure.

FIG. 5 is a view representing changes in the collection amount of the substances other than PM with respect to the temperature in the filter 20. As the temperature in the filter 20 rises, the amount of the collected substances other than PM decreases, because the moisture in the substances other than PM evaporates, and the soluble organic constituents in the substances other than PM are partially decomposed into gases through oxidation. That is, the performance of the control for raising the temperature of exhaust gas flowing into the filter 20 contributes towards raising the temperature in the filter 20, and reducing the collection amount of the substances other than PM. Thus, the amount of microwaves absorbed by PM increases, so the PM become likely to burn.

Figure 6:
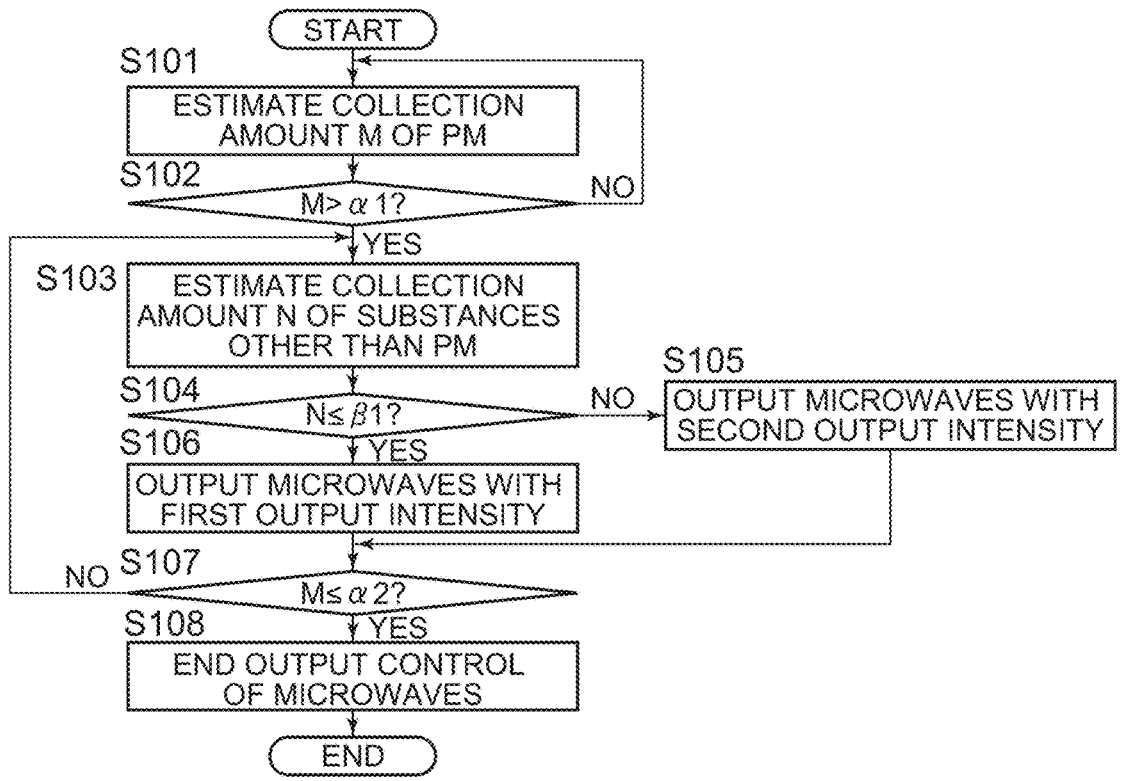
FIG. 6 is a flowchart showing the contents of control that is performed in the exhaust gas control apparatus for the internal combustion engine according to the embodiment of the disclosure.

FIG. 6 is a flowchart showing the contents of the control performed in the exhaust gas control apparatus for the internal combustion engine according to the embodiment of the disclosure. In step S101, the acquisition unit 41 acquires a collection amount M of PM based on a rotational speed and a fuel injection amount of the internal combustion engine 10 acquired from the internal combustion engine 10 and the map stored in the acquisition unit 41. After acquisition of the collection amount M of PM, it is estimated whether or not the collection amount M of PM is larger than the first threshold ($\alpha 1$) (step S102). If the collection amount M of PM is equal to or smaller than $\alpha 1$, a return to step S101 is made. If the collection amount M of PM is larger than $\alpha 1$, a transition to step S103 is made, and the acquisition unit 41 acquires a collection amount N of the substances other than PM from the rotational speed and the fuel injection amount of the internal combustion engine 10 acquired from the internal combustion engine 10 and the map stored in the acquisition unit 41. After acquisition of the collection amount N of the substances other than PM, the control unit 43 estimates whether or not the collection amount M of the substances other than PM is equal to or smaller than the second threshold ($\beta 1$) (step S104). If the collection amount N of the substances other than PM is equal to or smaller than $\beta 1$, the control unit 43 causes the electromagnetic wave output unit 42 to output microwaves with a first output intensity (step S106), and then makes a transition to step S107, which will be described later. If the collection amount N of the substances other than PM is larger than β1, the control unit 43 causes the electromagnetic wave output unit 42 to output microwaves with a second output intensity that is lower than the first output intensity (step S105), and then makes a transition to step S107.

In step S107, the control unit 43 estimates whether or not the acquired collection amount M of PM is equal to or smaller than the third threshold (β2). If the collection amount M of PM is larger than α2, the control unit 43 returns to step S103. If the collection amount M of PM is equal to or smaller than α2, the control unit 43 makes a transition to step S108, and causes the electromagnetic wave output unit 42 to end output control of microwaves. Incidentally, the first output intensity is an output intensity that prevents the temperature of the filter 20 from rising excessively and prevents the filter 20 from being damaged due to the combustion of a large amount of PM collected by the filter 20. Besides, the second output intensity is an output intensity that makes the total radiation amount of microwaves radiated during a period to a timing when the collection amount M of PM becomes equal to or smaller than α2 smaller than in the case where microwaves continue to be output with the first output intensity.

As described above, when the amount of the substances other than PM collected by the filter 20 is larger than β1, microwaves are output during a period to a timing when the collection amount N of the substances other than PM becomes equal to or smaller than β1, with the second output intensity that is lower than the first output intensity. Thus, the amounts of microwaves with which PM and the substances other than PM are irradiated become small, and the absolute amount of microwaves absorbed by the substances other than PM is reduced, during the period to the timing when the collection amount N of the substances other than PM becomes equal to or smaller than β1. That is, the ratio of the amount of microwaves used for the combustion of PM to the total radiation of microwaves during the period to the timing when the collection amount M of PM becomes equal to or smaller than β2 increases. Therefore, the combustion amount of PM increases with respect to the total radiation amount of microwaves, so PM can be efficiently burned.

Figure 7:
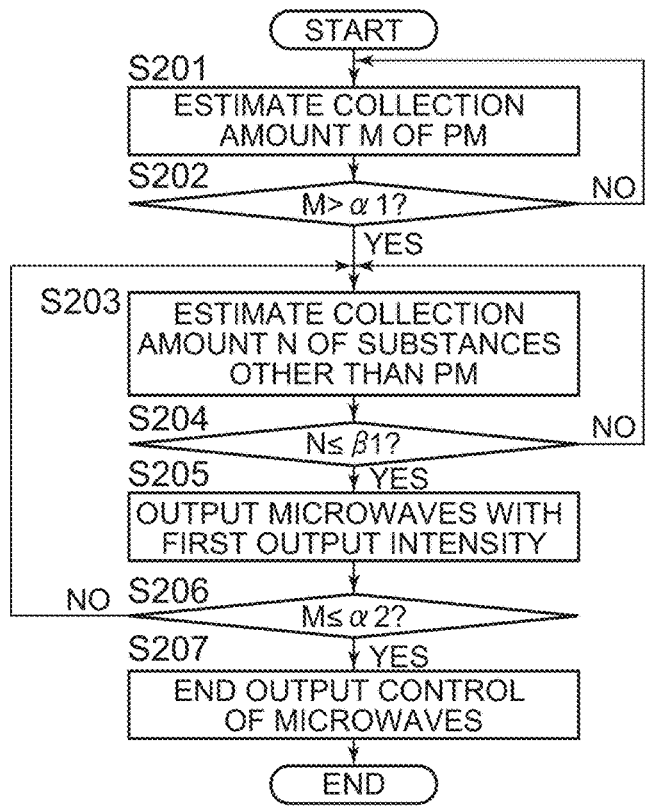
FIG. 7 is a flowchart showing a modification example of the contents of control that is performed in the exhaust gas control apparatus for the internal combustion engine according to the embodiment of the disclosure.

FIG. 7 is a flowchart showing a modification example of the contents of the control performed in the exhaust gas control apparatus for the internal combustion engine according to the embodiment of the disclosure. Steps S201 to S204 are identical to steps S101 to S104 of the flowchart of FIG. 5 respectively, so the description thereof will be omitted. In step S204, if the collection amount N of the substances other than PM is equal to or smaller than β1, the control unit 43 causes the electromagnetic wave output unit 42 to output microwaves with the first output intensity (step S205), and then makes a transition to step S206, which will be described later. If the collection amount N of the substances other than PM is larger than β1, the control unit 43 returns to step S203 without causing the electromagnetic wave output unit 42 to output microwaves.

In step S206, the control unit 43 estimates whether or not the acquired collection amount M of PM is equal to or smaller than the third threshold (α2). If the collection amount M of PM is larger than α2, the control unit 43 returns to step S203. If the collection amount M of PM is equal to or smaller than α2, the control unit 43 makes a transition to step S207, and causes the electromagnetic wave output unit 42 to end output control of microwaves.

As described above, when the amount of the substances other than PM collected by the filter 20 is larger than β1, no microwaves are output. Thus, the amount of microwaves absorbed by the substances other than PM becomes equal to zero, during the period to the timing when the collection amount of the substances other than PM becomes equal to or smaller than β1. That is, the ratio of the amount of microwaves used for the combustion of PM to the total radiation amount of microwaves in the period to the timing when the collection amount M of PM becomes equal to or smaller than α2 increases. Therefore, the combustion amount of PM increases with respect to the total radiation amount of microwaves, so the PM can be efficiently burned.

Figure 8:
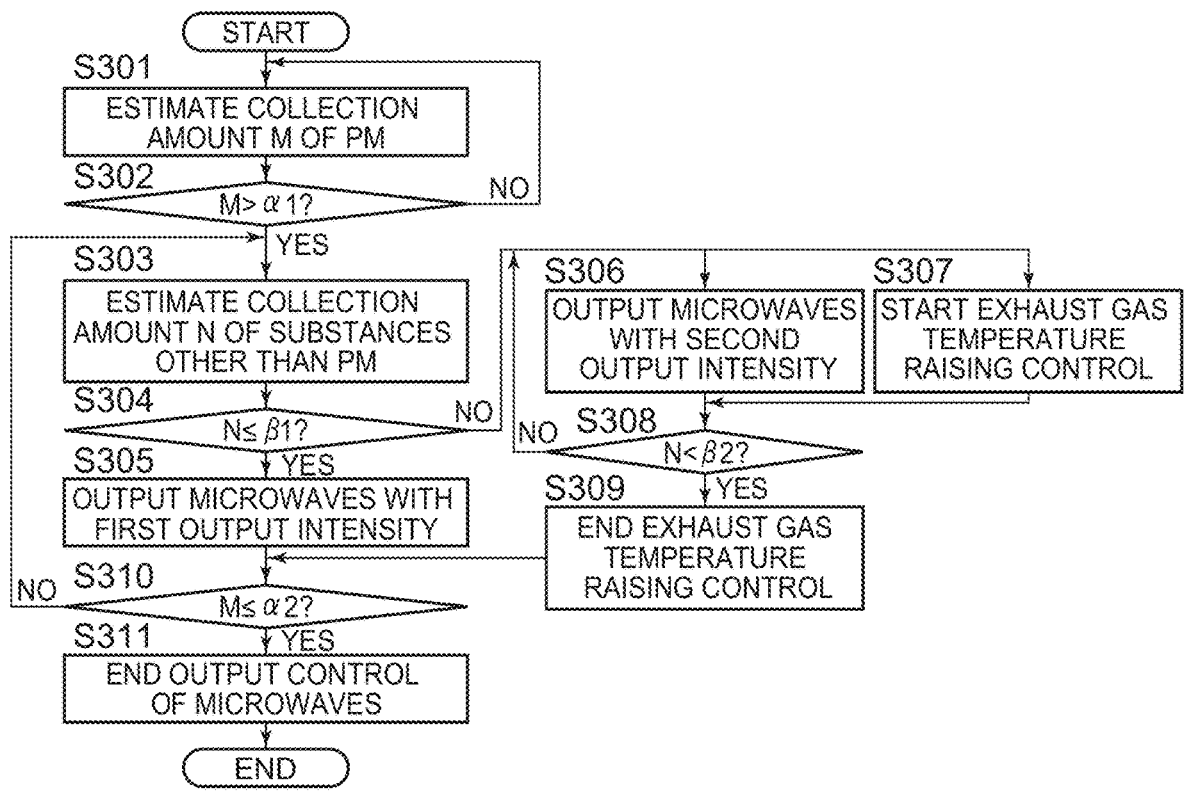
FIG. 8 is a flowchart showing the contents of control that is performed in an exhaust gas control apparatus for an internal combustion engine according to an additional one of the embodiments of the disclosure.

FIG. 8 is a flowchart showing the contents of the control performed in an exhaust gas control apparatus for an internal combustion engine according to an additional one of the embodiments of the disclosure. In concrete terms, steps S301 to S304 are identical to steps S101 to S104 of the flowchart of FIG. 5 respectively, so the description thereof will be omitted. In step S304, if the collection amount N of the substances other than PM is equal to or smaller than β1, the control unit 43 causes the electromagnetic wave output unit 42 to output microwaves with the first output intensity (step S305), and then makes a transition to step S310, which will be described later. If the collection amount N of the substances other than PM is larger than β1, the control unit 43 causes the electromagnetic wave output unit 42 to output microwaves with the second output intensity (step S306). Furthermore, after causing the internal combustion engine control unit 50 to start exhaust gas temperature raising control (step S307) simultaneously with step S306, the control unit 43 makes a transition to step S308.

In step S308, the control unit 43 estimates whether or not the collection amount N of the substances other than PM acquired by the acquisition unit 41 is smaller than the fourth threshold (β2). If the collection amount N of the substances other than PM is equal to or larger than β2, the control unit 43 returns to steps S306 and S307. If the collection amount N of the substances other than PM is smaller than β2, the control unit 43 causes the internal combustion engine control unit 50 to end exhaust gas temperature raising control (step S309), and then makes a transition to step S310. In step S310, the control unit 43 estimates whether or not the collection amount M of PM is equal to or smaller than β2. If the collection amount M of PM is larger than β2, the control unit 43 returns to step S303. If the collection amount M of PM is equal to or smaller than α2, the control unit 43 makes a transition to step S311, and causes the electromagnetic wave output unit 42 to end radiation control of microwaves. Incidentally, although step S306 and step S307 are simultaneously carried out in the present embodiment, step S307 may be carried out after carrying out step S306, or vice versa. Besides, the steps starting from step S301 may be carried out after steps S303, S304, and S306 to S309. Only step S307 may be carried out without outputting microwaves with the second output intensity in step S306.

As described above, when the collection amount of the substances other than PM is larger than β1, the substances other than PM can be burned, and the collection amount of the substances other than PM can be reduced by raising the temperature of exhaust gas. Thus, the absolute amount of microwaves absorbed by the substances other than PM can be significantly reduced during the period to the timing when the collection amount of the substances other than PM becomes equal to or smaller than β1. That is, the ratio of the amount of microwaves used for the combustion of PM to the total radiation amount of microwaves during the period to the timing when the collection amount M of PM becomes equal to or smaller than α2 increases. Therefore, the combustion amount of PM increases with respect to the total radiation amount of microwaves, so the PM can be efficiently burned.

Figure 9:
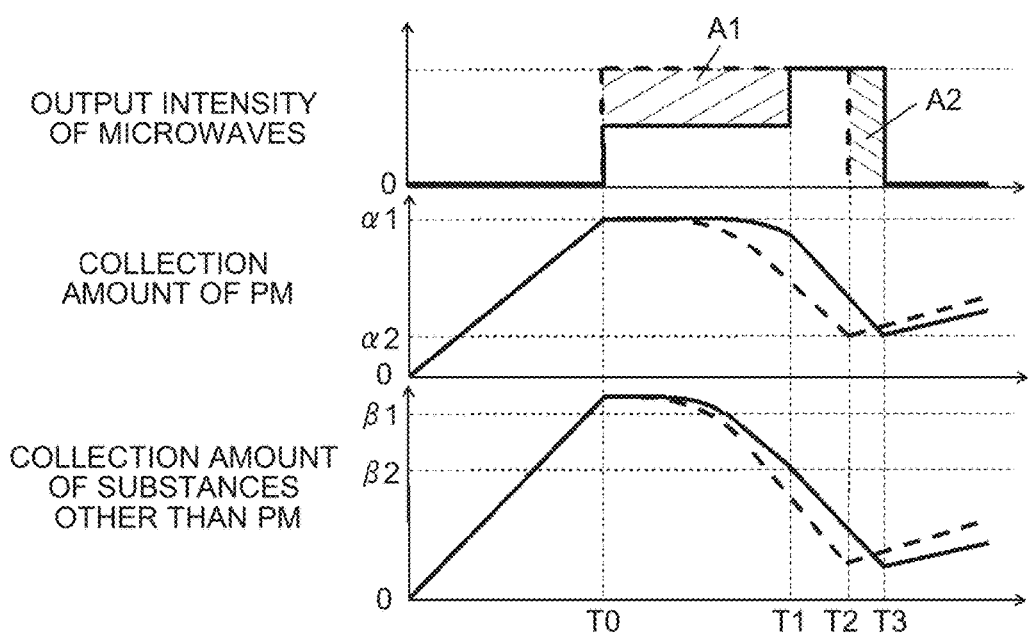
FIG. 9 is a time chart showing the contents of control that is performed in the exhaust gas control apparatus for the internal combustion engine according to the embodiment of the disclosure.

FIG. 9 is a time chart showing the contents of the control performed in the exhaust gas control apparatus for the internal combustion engine according to the embodiment of the disclosure and corresponding to the flowchart of FIG. 5. In the present time chart, the control according to the present embodiment is indicated by a solid line, and conventional control (the control in the case where microwaves are output only with the first output intensity) is indicated by a dotted line.

At a timing T0 when the collection amount of PM becomes larger than α1, the outputting of microwaves is started with the first output intensity in the conventional control. On the other hand, in the control according to the present embodiment, the collection amount of the substances other than PM becomes larger than β1 in addition to the fact that the collection amount of PM becomes larger than α1, so the outputting of microwaves is started with the second output intensity that is lower than the first output intensity. Then, in both the types of control, the temperature of PM and the temperature of the substances other than PM reach a temperature leading to combustion, and the collection amounts start decreasing, after the lapse of a predetermined time from the start of the outputting of microwaves.

At a timing T1, the collection amount of the substances other than PM becomes smaller than β2, so the outputting of microwaves is started with the first output intensity, in the control according to the present embodiment. Then, at a timing T2, the collection amount of PM becomes equal to or smaller than α2, so output control of microwaves is ended, in the conventional control.

Then at a timing T3, the collection amount of PM becomes equal to or smaller than α2, so output control of microwaves is ended in the control according to the present embodiment. Besides, in the control according to the present embodiment, the collection amount of PM at the timing T1 is larger than in the conventional control, so it takes a time corresponding to the difference between the timing T2 and the timing T3 until the collection amount of PM becomes equal to or smaller than α2.

Besides, in the conventional control, during the period from the timing T0 to the timing T1, microwaves are output with a higher output intensity than in the control according to the present embodiment, so microwaves are radiated in an amount increased by a value corresponding to an area A1. On the other hand, in the present embodiment, during the period from the timing T2 to the timing T3, microwaves are output for a longer time than in the conventional control, so microwaves are radiated in an amount increased by a value corresponding to an area A2. Therefore, in the control according to the present embodiment, the second output intensity is set such that the value corresponding to the area A1 becomes larger than the value corresponding to the area A2.

Figure 10:
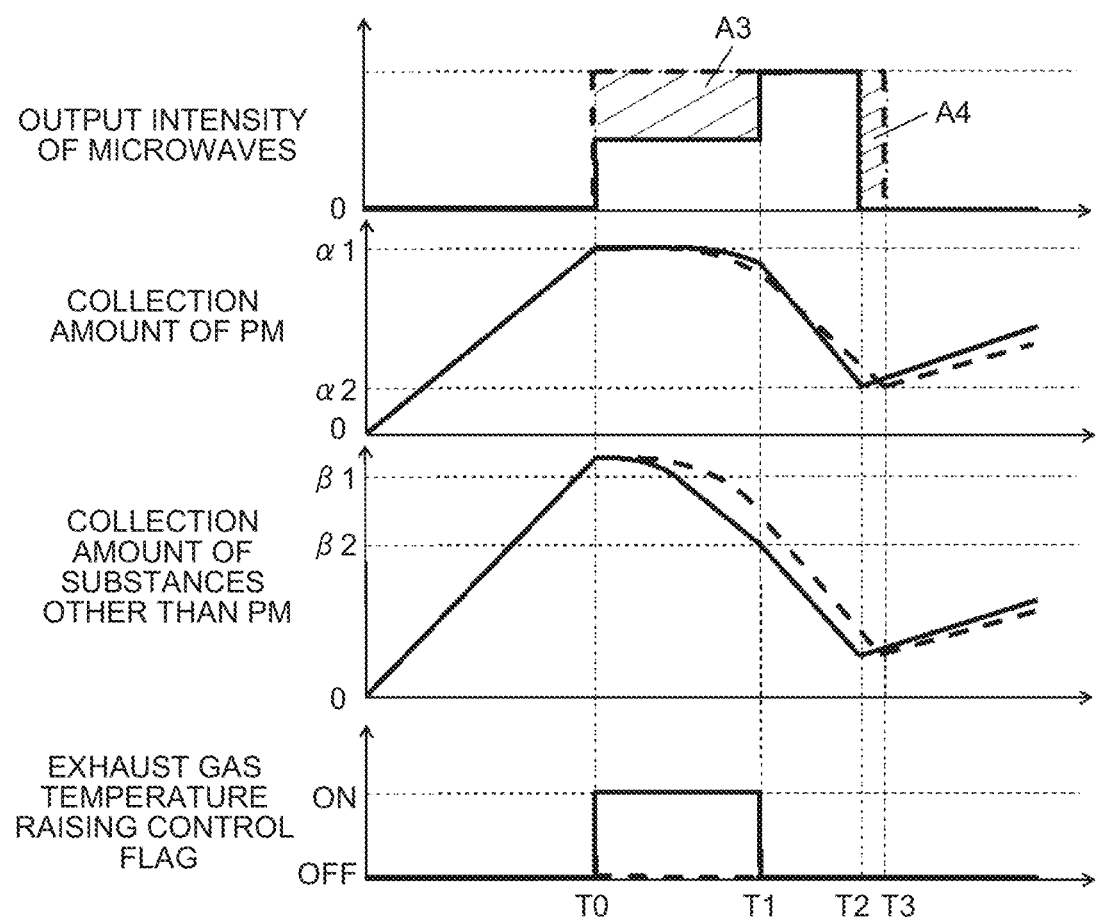
FIG. 10 is a time chart showing the contents of control that is performed in the exhaust gas control apparatus for the internal combustion engine according to the additional embodiment of the disclosure.

FIG. 10 is a time chart showing the contents of the control performed in the exhaust gas control apparatus for the internal combustion engine according to the additional embodiment of the disclosure and corresponding to the flowchart of FIG. 7. In the present time chart, the control according to the present embodiment is indicated by a solid line, and the conventional control (the control in the case where microwaves are output only with the first output intensity) is indicated by a dotted line.

At the timing T0 when the collection amount of PM becomes larger than α1, the outputting of microwaves is started with the first output intensity in the conventional control. On the other hand, in the control according to the present embodiment, the collection amount of the substances other than PM becomes larger than β1 in addition to the fact that the collection amount of PM becomes larger than α1, so the outputting of microwaves is started with the second output intensity that is lower than the first output intensity, and an exhaust gas temperature raising control flag is turned ON to start exhaust gas temperature raising control. Moreover, in both the types of control, the temperature of PM and the temperature of the substances other than PM reach a temperature leading to combustion, and the collection amounts of PM and the substances other than PM start decreasing after the lapse of a predetermined time after the start of the outputting of microwaves. In the control according to the present embodiment, however, the raising of the temperature of exhaust gas is carried out, so the collection amount of the substances other than PM decreases quickly and drastically.

In the control according to the present embodiment, at the timing T1, the collection amount of the substances other than PM becomes smaller than β2, so the outputting of microwaves is started with the first output intensity, and exhaust gas temperature raising control is ended to turn the exhaust gas temperature raising control flag OFF. In the conventional control, at the timing T2, the collection amount of PM becomes equal to or smaller than α1, so output control of microwaves is ended.

At the timing T1, the collection amount of the substances other than PM is smaller than in the conventional control, so the amount of microwaves absorbed by PM increases, and the amount of PM decreases more quickly than in the conventional control. At the timing T2, the collection amount of PM becomes equal to or smaller than α2, and output control of microwaves ends. On the other hand, in the conventional control, the collection amount of the substances other than PM at the timing T1 is larger than in the control according to the present embodiment. Thus, the amount of microwaves absorbed by PM decreases, so the collection amount of PM becomes equal to or smaller than α2 at the timing T3 that is later than the timing T2, and output control of microwaves is ended.

Besides, in the conventional control, during the period from the timing T0 to the timing T1, microwaves are output with a higher output intensity than in the control according to the present embodiment, so microwaves are radiated in an amount increased by the value corresponding to the area A1. Furthermore, in the conventional control, during the period from the timing T2 to the timing T3, microwaves are output for a longer time than in the control according to the present embodiment, so microwaves are radiated in an amount increased by the value corresponding to the area A2. Therefore, the total radiation amount of microwaves that are radiated until the amount of PM becomes equal to or smaller than α2 is smaller in the control according to the present embodiment than in the conventional control, by the total radiation amount corresponding to the area A1 and the area A2.

As described above, according to the present embodiment, when the amount of the substances other than PM collected by the filter 20 is larger than β1, the substances other than PM are removed through combustion by lowering the output intensity of microwaves or raising the temperature of exhaust gas. Thus, the absolute amount of microwaves absorbed by the substances other than PM can be reduced during the period to the timing when the collection amount of the substances other than PM becomes equal to or smaller than β1. Therefore, the ratio of the amount of microwaves used for the combustion of PM to the total radiation amount of microwaves radiated during the period to the timing when the collection amount M of PM becomes equal to or smaller than α2 increases. Accordingly, even when a large amount of the substances other than PM are mixed together in the filter 20, the PM can be efficiently burned.

What is claimed is:

1. An exhaust gas control apparatus for an internal combustion engine, the exhaust gas control apparatus comprising:
    an electromagnetic wave output circuit that outputs, to a filter that collects particulate matter (PM) contained in exhaust gas discharged from the internal combustion engine, electromagnetic waves of a frequency that enables combustion of the PM collected by the filter; and
    at least one controller that
        is connected to the electromagnetic wave output circuit via an electric line,
        acquires collection amounts of PM as exhaust emissions contained in exhaust gas discharged from the internal combustion engine and substances other than PM, based on a rotational speed and a fuel injection amount of the internal combustion engine, and
        controls an output intensity of the electromagnetic waves output by the electromagnetic wave output unit, wherein
    the at least one controller causes the electromagnetic wave output circuit to output electromagnetic waves with a first output intensity when the collection amount of the substances other than PM becomes equal to or smaller than a predetermined threshold, and causes the electromagnetic wave output circuit to output electromagnetic waves with a second output intensity that is lower than the first output intensity when the collection amount of the substances other than PM becomes larger than the predetermined threshold, in a case where the collection amount of PM has exceeded a permissible value of the collection amount of PM in the filter.

2. The exhaust gas control apparatus for the internal combustion engine according to claim 1, wherein
    the at least one controller performs control in such a manner as to cause the electromagnetic wave output circuit to refrain from outputting electromagnetic waves when the collection amount of the substances other than PM becomes larger than the predetermined threshold, in the case where the collection amount of PM has exceeded the permissible value of the collection amount of PM in the filter.

3. The exhaust gas control apparatus for the internal combustion engine according to claim 1, the exhaust gas control apparatus further comprising:
    an internal combustion engine controller, wherein
    the at least one controller causes the internal combustion engine controller to perform control for raising a temperature of exhaust gas when the collection amount of the substances other than PM becomes larger than the predetermined threshold, in the case where the collection amount of PM has exceeded the permissible value of the collection amount of PM in the filter.

* * * * *